ic Patent [19] [11] 4,136,215
den Otter et al. [45] Jan. 23, 1979

[54] PROCESS FOR PREPARING A COATED, THERMOSETTING PLASTIC FOAM HAVING IMPROVED PROPERTIES

[75] Inventors: Marinus J. A. M. den Otter, Munstergeleen; Anne te Nijenhuis, Brunssum, both of Netherlands

[73] Assignee: Stamicarbon, B.V., Geleen, Netherlands

[21] Appl. No.: 649,521

[22] Filed: Jan. 15, 1976

[30] Foreign Application Priority Data
Jan. 17, 1975 [NL] Netherlands ............................ 7500548

[51] Int. Cl.² ............................................. B05D 1/36
[52] U.S. Cl. ....................................... 427/204; 427/202;
427/373; 428/143; 428/150; 428/306; 428/308;
428/309; 428/320; 428/921
[58] Field of Search ............... 428/150, 306, 308, 320,
428/321, 322, 331, 309, 148, 317, 143, 920, 921;
427/201, 202, 204, 205, 209, 373; 264/131, 45.1

[56] References Cited

U.S. PATENT DOCUMENTS

| | | | |
|---|---|---|---|
| 2,220,140 | 11/1940 | Bartling et al. | 264/131 |
| 3,679,539 | 7/1972 | Gossens et al. | 428/150 |

FOREIGN PATENT DOCUMENTS

| | | | |
|---|---|---|---|
| 2061253 | 10/1971 | Fed. Rep. of Germany | 427/205 |
| 1534847 | 6/1967 | France. | |
| 268016 | 3/1927 | United Kingdom | 427/202 |
| 1389446 | 4/1975 | United Kingdom. | |

*Primary Examiner*—Stanley S. Silverman
*Attorney, Agent, or Firm*—Cushman, Darby & Cushman

[57] ABSTRACT

The invention disclosed is a process for the production of a cellular thermosetting foam provided on at least one surface with a reinforcing and fire resisting layer of particulate material. A foamable composition is distributed on a suitable substrate surface and a layer of particulate material is evenly distributed on the surface of said composition prior to complete curing. As inexpensive material such as sand or gravel may be used, the process is economic and easy to apply. It can be used for the production of slabs of cellular plastic or of foam layers with a protective coating on e.g. wall panels, roofs, insulating material and the like.

12 Claims, No Drawings

PROCESS FOR PREPARING A COATED, THERMOSETTING PLASTIC FOAM HAVING IMPROVED PROPERTIES

BACKGROUND OF THE INVENTION

The invention relates to a process for preparing coated, thermosetting plastic foam having improved properties and articles so produced.

Thermosetting plastic foam is frequently used as material for articles, particularly in plates and building panels, for sound and heat isolation. Previously the use of such materials has been limited because of the combustibility and low strength of such plastic foams. In order to eliminate these drawbacks, it has been proposed to laminate one or both sides of these articles with paper, plastic sheeting, metal plates and metal sections, wood fiber board, gypsum board, or the like. Flame-extinguishing agents may be added to the foam-forming material to improve the fire resistance.

According to the present invention a thermosetting plastic foam provided on at least one surface with a coating layer can be obtained in the process of allowing a foam-forming composition to cure into a solid plastic foam on a suitable substrate, or in a suitable mold, while in contact with the coating-layer material, at least one surface of the foam being provided with a thin, continuous layer of inert material, which is connected to and integral with the foam. That is, the foam-forming composition is contacted with an evenly distributed layer of inert material consisting of non-coherent particles, at least at a point in time at which the foam-forming composition, or the resulting foam, is adhesive and partly penetrable to the particulate material.

In this way, objects, especially sheets of material can be obtained having a surface with strongly improved fire resistance and increased strength. The resulting product in sheet form, is particularly adapted for use as a construction panel to be applied, for instance, over existing walls as a sound/heat insulator.

DETAILED DESCRIPTION OF THE INVENTION

The process of the present invention is conducted without difficulty and in a direct manner as described in more detail below. The particulate material need not be expensive; readily available, cheap materials like sand or stone chippings may be used. In addition to improving the technical properties of the product, an aesthetical effect may be achieved by using colored coating-layer material.

It is already known that the fire resistance of, for instance, a plastic foam sheet is also attendant with the formation of cracks during heating. To prevent crack formation it has been proposed, therefore, that glass fibers or rovings be incorporated into the foam; see German Patent Application No. 2,307,490. It is surprising that according to the present invention a similar result can also be achieved with a thin coating layer of particle-shaped material whose particles are non-coherent prior to the application onto the forming foam sheet. We have also found that the presence of a coating layer according to the present invention also reduces the development of smoke and flames during heating.

The material used for the coating layer may be selected from a wide variety of organic or inorganic materials. Examples of suitable organic materials include particles of cured urea-formaldehyde resin, particles of melamine-formaldehyde resin, particles of phenol-formaldehyde resin, particles of a high-melting and/or slow-burning polymer like polyimide. The material should adhere to the foam layer at least reasonably well and in some cases a pre-treatment procedure is required to attain the desired degree of retention.

Examples of inorganic material are: basalt, granite, quartz, mica, slate, sandstone, pumice, natural particle-shaped materials such as sand or fine gravel, silicates, asbestos, oxides of, for instance, magnesium, silicium, titanium or aluminum, titanates like potassium titanate, barium titanate, sulphates such as calcium sulfate (gypsum), carbonates such as calcium carbonate, carbides like silicon carbide, iron carbide or borium carbide, nitrides such as aluminum nitride or borium nitride, metals like iron, aluminum or vanadium, glass, also in the form of hollow particles (micro-balloons), and products made of baked clay, for instance stone powder or stone chippings, blown and baked clay.

We have found that a desirable combination of high melting point, good availability and low price is generally found with ground minerals, sand, fine gravel, glass, gypsum and expanded clay. As a rule, we prefer to use an inert, high-melting, inorganic material. The physical configuration of the individual particles of the coating layer material is not critical and may be in the form of granules having a practically spherical shape or a more irregular or angular shape such as that of chips, or in the form of small fibers.

Material consisting of granules or chippings will generally be cheaper and easier to handle than fibrous material and will yield virtually the same results when used, so that application of a coating material in the form of granules or chippings is preferred.

The granular material may have an average diameter of between 0.005 mm and about 10 mm, and preferably of between about 0.1 and 5 mm to provide for easier application.

The size chosen depends on a number of factors including the availability of the material in various sizes and grades, the method of application and the specific gravity (in the case of porous or hollow particles, the apparent specific gravity) of the material. The relationship between the size of the particles and the method of application is discussed in more detail below.

When fibrous material is used, the fibers have a length of up to 50 mm, preferably between 0.05 and 10 mm, with a length-to-diameter ratio of between 2:1 and 150:1.

Combinations of two or more coating-layer materials which differ mutually in type, size, shape or color may be applied. An attractive, aesthetic effect may be achieved by using a colored material.

The coating-layer material should for the most part be inert. The surface of the particles, however, may, by their own nature or by any pretreatment, possess reactive groups that so react with the foam-forming composition to achieve a greater adherence of the particles to the foam. The material may, if necessary, be dried beforehand.

For the thermosetting plastic foam, a wide variety of known, commercially available materials may be used, such as polyurethane foams, polyisocyanurate foams, aminoplast resin foams, phenoplast resin foams or polyester foams. The basic foam material is not itself novel, and is well described in a host of technical publications and patents; methods of foam preparation are also known. The art has recognized various additives and processing conditions to be used in the preparation of such foams and, while not forming a part of the present invention as such, are described hereinbelow to further explain the novel process and resulting product.

The polyurethane foam is prepared in the usual way by starting from a polyisocyanate, a polyol, a blowing agent, and, further, the usual art-recognized additives like accelerators and catalysts, surface-active compounds, flame-extinguishing agents, cross-linking agents, and the like.

Polyisocyanurate foam is prepared in the same way as polyurethane foam, however, using a trimerization catalyst, by replacing the polyisocyanate by a trimerized polyisocyanate or by using a bis- or tris-hydroxylalkylisocyanurate as the polyol.

These foams are formed into articles by mixing the foam-forming components and by then transferring the liquid, more or less viscous mixture to a mold or to a suitable, non-adhering substrate and causing it to foam and to cure, if necessary with heating. They may also be applied to an adhering substrate, for instance a gypsum board, a metal plate, bituminous paper, concrete, or the like.

Aminoplast resin foams and phenoplast resin foams are prepared by mixing a urea-formaldehyde precondensate, a melamine-formaldehyde precondensate or a resol in an aqueous solution with an aqueous solution of a surface-active agent that has been foamed, the mixing being effected in the presence of a suitable curing catalyst. The resulting mixture, which resembles whipped cream and has not yet become cured, is then transferred to a mold or to a suitable substrate.

Polyester foam is prepared from a mixture of an unsaturated polyester, one or more copolymerizable unsaturated monomers in which the polyester is soluble, a blowing agent, a catalyst, and, if so desired, further additives like an accelerator, flame-extinguishing agents, pigments and dyes, and the like. Next, the mixture is transferred to a mold and, while heated, caused to foam and to cure.

The particles of inert coating-layer material may be applied in different ways and illustrative procedures are described below.

According to one method the coating-layer material is evenly distributed on the bottom of the mold or the non-adhering substrate to be used, whereupon the foam-forming composition is poured or sprayed onto it. The mold need not have a plane surface but may be irregular, however, a substantially flat, level mold surface is easier to work with. The shape and the dimensions of the material as well as the viscosity of the foaming composition is then chosen such that the coating-layer material does not, to an appreciable extent, rise and spread in the foam matrix prior to or during the foaming and curing. Further, the ven distribution of the particulate material should be disturbed as little as possible while the foamable liquid is poured onto the mold surface. One skilled in the art will realize this by a proper choice of the feeding rate of the foam-forming composition, of the outlet aperture and the distance and the angle of incidence of the outlet aperture.

The preferred and especially advantageous method, however, consists in applying the coating-layer material onto the foam-forming composition during any stage of the process prior to complete curing and before the adhesive power of the foam-forming or formed becomes too little. The exact point in time also depends, to some extent, upon the nature of the coating-layer material itself. The appropriate application time is well within determination of a skilled operator and is easily found by a few tests. Taking the specific gravity and the viscosity of the foam-forming composition into account, the size and the specific gravity of the coating-layer material should be chosen such that the coating-layer material itself becomes embedded in the foam layer to some slight extent, but taking care that it does not fully subside into it, unless this occurs because of the weight of superposed coating-layer particles.

By combining the two methods described above, it is possible to fabricate articles with a coating layer on two sides, like sheets or forms, made of the plastic foam.

In either method described above, therefore, a certain inter-penetration of the thin layer of coating material and the foam-forming composition should occur. Adjustment of the various parameters results in the material applied to the foam to be embedded in the foam to about half the diameter of the particles. In the event the thickness of the coating layer desired is itself greater than the diameter of the particles, the particles lower in the coating layer with respect to the foam may be pressed, by the weight of the superposed particles, into the foam-forming composition or the foam-forming in situ. However, the particles should be applied to the foam composition at such a point in time that influence of gravity and the dropping rate does not cause them to disappear into and be enveloped in the foam matrix to the extent that they loose contact with the outside coating layer. While this may appear difficult, it is easily achieved in actual practice and on the basis of a few manual tests one skilled in the art can determine in a simple and direct manner the optimum time and method for application of the coating-layer material suitable for a given foam-forming composition and a given coating-layer material. We have found, for instance, that sand is simpler in this respect than using coarser material like gravel.

When applying a layer of foam to an irregular surface with e.g., ridges, it is especially advantageous to use compressed air to blow sand onto the foam-forming composition or the nearly cured foam, as the air then assists in the distribution of the foam over the irregular surface.

Plates or strips of material according to the present invention can be made continuously using an apparatus consisting of two belts which run parallel to each other and have a non-adhering surface, in which, possibly, the space between the belts is limited on either side by fixed or movable partitions or belts, so that a space is defined between the belts and side members having a rectangular cross-section. A coating-layer material is evenly distributed on the lower belt and the foam-forming composition is subsequently placed on top of the coating-layer material. As the belt progresses and at a point further downstream where the foam still has adhesive power and is not rigid, more coating-layer material is preferably distributed evenly over the same side of the foam, whereupon the material further cures to a non-adhesive, rigid state and within the space limited by the running belts and side members. In a continuous process such as that described it is also possible to coat the opposide surface of the foam while still tacky when a two-sided coated article is desired.

In another arrangement an apparatus is provided for covering the upper surface with a foam layer which is topped with coating-layer material consisting of a movable device for distributing the foam-forming composition onto a suitable substrate and suitable distribution means for applying the coating-layer material. Such a coating distribution means, when viewed in the direction of movement, is positioned behind the foam distribution device with which it is connected. In this arrangement the distance between the foam-forming composition applicator and the coating-layer material distributor is pre-set so that the coating-layer material falls onto the foam-forming composition at that point in time when the foam is still adhesive and has the proper consistency such that the coating-layer material becomes at least partially, but not completely embedded into the foam layer or traverses through this layer down onto the substrate.

The procedures described herein and forming a part of the present invention are useful for preparing objects consisting in whole or in part of a layer of thermosetting plastic foam which is covered on at least one surface thereof with a coating layer of inert, particle-shaped material adhered to the foam layer. If the coating layer is applied on only one side of the foam, the opposite surface of the foam layer may be completely exposed or be covered with, for instance, plastic sheet, metal foil, metal plates or sections, wood, veneer, plywood, kraft paper, decorative vinyl wall coverings, bituminous (tar) paper, particle board, chip board, concrete, gypsum plate, wallboard or the like. If desired, a layer of relatively coherent material may be applied to the coating layer as any additional layer according to the invention by means of an appropriate adhesive. This extra coating layer may be sheeting, or hard, plate-shaped material, or a layer of lacquer. The foam provided with a coating layer according to the invention may be easily sawn, nailed, glued or lacquered and subjected to normal construction techniques and methods.

In an inorganic, preferably mineral, coating-layer material is used, the surface of the resulting article may also be conveniently painted with a latex, water-based paint.

Depending upon the end use of the final product it may be necessary to incorporate a reinforcement in the foam layer in the form of metal or wood sections or plates, of filaments or fabrics. Also, mechanical coupling means may be included so as to join one panel to another or to secure a panel to a plane surface.

We have found that the process of the present invention is particularly suitable for preparing an insulation material in the form of plates, semi-laminates, partitioning walls, shells, and the like having a fire-proof surface. Other end uses will be apparent.

Futher, a special advantage of this invention is the possibility of providing rugged or irregularly profiled, textured surfaces with a fire-resistant and reinforcing coating layer by applying the foam-forming composition onto the substrate and next distributing the particulate material on top of the nearly-cured foam. The foam itself may not only act as insulation, but it may also act, for instance, as adhesive, e.g., bonding a reinforcing frame or the like to the backside of a metal sheet or a gypsum board.

We wish to make clear that we are not here describing the application of a fabric or textile material, fleece or sheet onto the surface of a layer of thermosetting foam, during or after the curing. In like manner, we are not here describing preparing a plastic foam which is itself filled with a particulate material in such a way that at least the major portion of the filler is homogeneously present within the plastic matrix, or to applying plastic foam to particled material which was previously already connected to a coherent common substrate.

The thickness of the foam layer may vary within broad limits, for instance between about 0.25 and about 10 cm, depending upon the end use of the article. In most cases, however, the thickness will be from 1 to 5 cm. The coating layer of particle-shaped material is essentially a closed layer which may vary in thickness between 1 D and 50 D, in which D represents the average cross-section of the particles, with a maximum thickness of about 1.5 cm, and preferably of maximum 0.5 cm. In most cases the thickness is between 1 D and 10 D. Particle size will, of course, vary throughout the stated range.

Sometimes it is difficult to determine exactly the border between the coating layer and the foam layer, particularly if larger particles are applied. The coating layer as used herein is defined as the layer at the surface of the foam layer, within which at least about 95% of all the coating-layer particles are present.

The invention will be further elucidated in more detail on the basis of the following examples. The burn-through test used in the examples is a modification of the burn-through test frequently applied in Britain and the torch test applied in the United States by the Bureau of Mines. The test was conducted by arranging a sample of material 15 × 15 cm in size and having a certain thickness, vertically in a draft-free space. Thermocouples were mounted at the front and rear sides of the sample with respect to the flame direction to determine the temperature in the middle of the surface area. On one side a propane gas burner was arranged with the aperture at a distance of 40 mm from the test piece surface. The horizontal flame, which was directed at the middle of the test piece and had a blue cone of about 20 mm, was so set that a temperature of 1200° (± 25° C.) was reached on the surface of the test piece. A piece of filter paper 14.5 × 14.5 cm in size was stapled against the back of the sample. When the sample burns through, the temperature measured at the rear side by the thermocouple immediately increases and the filter paper ignites into flame. The burn-through time is measured as the time from the point of ignition of the propane gas flame until the sample burns through.

EXAMPLE 1

Part A. A polyurethane foam was prepared in the usual way starting from Desmophen FWFA-O (commercial product of Bayer A.G., a polyol having a hydroxyl number of 325–375), Desmodur 44 V (commercial product of Bayer A.G., polymethylene polyphenylisocyanate), Frigen 11 (monofluortrichloromethane), and triethylamine(formulated according to brochure D 48 679/66 739 dated August, 1969, of Bayer A.G., however, with half the quantity of blowing agent there mentioned). A block of fine-cellular foam was obtained having a density of 51 kg/m$^3$. A sample of 15 × 15 × 5.1 cm was cut therefrom and subjected to the burn-through test. Immediately after the ignition of the gas flame strong smoke developement occurred and the sample started burning. The burn-through time amounted to 3.5 minutes.

Part B. A polyurethane foam sheet coated on two sides was obtained by evenly distributing a quantity of sand in a flat mold having a non-adhering surface, by placing onto this the foam-forming composition prepared according to Part A of this Example, and as soon as the foam had risen to about one third of the maximum height, by distributing a quantity of sand on the thus forming foam with the aid of a screen. The thickness of the sheet was set at approximately 5 cm by means of a cover plate which had been arranged at a distance of 5 cm from the bottom and which had a non-adhering surface. In this way a sheet coated with sand on two sides was obtained with a foam layer thickness at 51 kg/cm$^3$ and a sand layer thickness of 1.6 mm on the bottom and of 1 mm on the top. The sand used in this experiment had been previously dried for 4 hours at 150° C. and had an average particle size of less than 1 mm.

A 15 × 15 cm sample was cut out of the sheet with a saw and subjected to the burn-through test, the bottom side facing the flame. Only during the first minute of the test did smoke develop and flame phenomena occur to a limited extent. The burn-through time amounted to 21 minutes.

EXAMPLE 2

Part A. A polyurethane foam containing isocyanurate groups, hereafter referred to as polyisocyanurate foam, was prepared in the manner described in Netherlands Patent Application No. 7,408,244, starting from trishydroxylmethyl isocyanurate in dimethyl formamide, polymethylene polyphenylisocyanate, dibutyltindiacetate, emulsifier, methylene dichloride, and 6.5 weight-% tris (2 chloroethyl) phsophate as flame extinguisher.

A sample of 15 × 15 × 4.3 cm was cut out of the block of fine-cellular foam having a density of 47 kg/m$^3$, which sample was then subjected to the burn-through test. During the first few minutes smoke development was observed. The burn-through time amounted to 12.7 minutes.

Part B. A polyisocyanurate foam sheet coated on one side was prepared starting from the foam-forming composition applied in Part A of this Example by distributing, during the foaming and in the same manner as described in Example 1, Part B, previously dried sand having a particle size less than 1 mm on the foam as it was formed. The thickness of the sheet was 5.3 cm, the density of the polyisocyanurate foam 65 kg/m$^3$, and the thickness of the sand layer at the top of the sheet was 1 mm. A 15 × 15 cm sample cut from the sheet was brought into contact with a flame on its coated side and subjected to the burn-through test. Very little smoke development and very few fine phenomena occurred. The burn through time amounted to 27 minutes.

EXAMPLE 3

A sheet of polyisocyanurate foam coated on two sides with particles of baked, expanded clay was prepared in the manner described in Example 1, Part B, in which, however, the foam-forming composition applied in Example 2, Part A was used. Baked and expanded clay (which was a commercial product identified as Korlin produced by DSM) having an average cross-section of 2–3.4 mm was applied to the bottom of the mold, and particles having a cross-section of less than 2 mm were evenly distributed on the foam as it was formed. The resulting sheet thus formed had a thickness of 4.7 cm, a foam density of 47 kg/m$^3$, and was coated on the bottom with a layer of Korlin granules about 5.5 mm thick and on the top with a Korlin-granule layer about 1.5 mm thick. A sample 15 × 15 cm was subjected to the burn-through test, with the bottom surface facing the flame. The smoke development was very small and the fire phenomena were very few. From the tenth minute of the test and thereafter Korlin particles occasionally dropped from the sample. However, a layer of dry wadding directly below the sample at about 20 cm and onto which the heated particles fell was not affected on this account. After 32 minutes a distinct crack formed in the surface and after 47 minutes burning gases issued from the widening cracks. The burn-through time amounted to 51 minutes.

EXAMPLE 4

A polyisocyanurate sheet coated on two sides with small glass beads was prepared in the same manner as in the way described in Example 3. The glass beads had an average size of less than 2 mm. In this way, a 4.9 cm thick sheet was obtained with a 5 mm thick layer of glass beads on the bottom of the sheet and a 3 mm thick layer of glass beads on the top; the foam had a density of 55 kg/m$^3$. During the burn-through test, with the top facing the flame, the glass started to sinter in the heated area after 1 minute. After 60 minutes, charred particles commenced to drop from the surface of the sheet and the temperature on the rear surface was measured at 80° C. The test was stopped after 87 minutes. The sheet had not yet become burnt through, but the temperature at the rear side increased to 380° C.

EXAMPLE 5

A polyisocyanurate sheet coated on two sides with gravel was prepared in the manner described in Example 3, however, a dry gravel was applied having an average cross-section diameter of between 2 and 5 mm. The sheet so prepared had a thickness of 5.0 cm, a foam density of 49 kg/m$^3$, a bottom layer and top layer thickness of 5–6 mm. When the flame was ignited during the burn-through test no fire phenomena or smoke development occurred. After 10 minutes gravel particles started to loosen frequently, as a result of which wadding located about 20 cm directly below the sample was ignited. The burn-through time was 20 minutes.

EXAMPLE 6

A polyisocyanurate foam sheet coated on two sides with sand was prepared in the manner described in Example 3. The sheet had a thickness of 43 mm. The thickness of the sand layer at the bottom was 1.5 mm and at the top 1 mm. The foam density was 56 kg/m$^3$ and the sand grain size was less than 1 mm. The burn through time, with the bottom of the sheet facing the flame, amounted to 27.5 minutes.

COMPARATIVE EXAMPLE A

For the sake of comparison, and using the mixture of Example 2, Part A, to form the polyisocyanurate foam, a 4.9 cm thick sheet of polyisocyanurate foam coated on both sides with aluminum film (0.1 mm thick) was prepared. The foam had a density of 52 kg/m$^3$. During the burn-through test a hole formed practically immediately in the aluminum film and continuous smoke development and fire phenomena were observed. The burn through time amounted to 32.5 minutes.

COMPARATIVE EXAMPLE B

For the sake of comparison a polyisocyanurate foam sheet, which was commercially available, was subjected to the burn-through test. The sheet thickness was 3.9 cm. The fine-cellular foam had a density of 32 kg/m$^3$. When heated, the surface started to show cracks immediately. Six minutes after the test had been commenced, flames were observed on the surface. The burn-through time amounted to 12 minutes.

What is claimed is:

1. A process for preparing a foamed thermosetting composition containing at least a surface layer of particulate particles embedded therein including the successive steps of:
   (1) distributing a foamable thermosetting liquid composition onto an adhering surface;
   (2) at least partially initiating the foam curing of said thermosetting composition;
   (3) thereafter evenly distributing on the exposed surface of the partially formed foam of step (2) a thin, continuous layer of inert, initially non-coherent particulate material; and
   (4) completing the foaming and curing of the thus coated thermosetting composition,
   whereby the inert, non-coherent particles are applied to the foam in step (3) at a time in which the foam composition is both adhesive to and at least partially penetrated by the contacted particulate material such that the foam, while still foaming, grows up and around the deposited particles, forming a continuous surface continuously having said inert particulate material distributed therethrough and integrally connected to the now-cured foamed structure of said thermosetting composition, said layer containing said particles having a discrete thickness extending within the said foamed structure.

2. The process according to claim 1 wherein the particles are of a non-flammable, high-melting inorganic material.

3. The process according to claim 1 wherein the particles are sand, pulverized rock, gypsum, glass or baked, expanded clay.

4. The process according to claim 1 wherein the particles have an average cross-section of between about 0.005 and about 10 mm.

5. The process according to claim 4 wherein particles have an average cross-section of between about 0.1 and 5 mm.

6. The process according to claim 1 wherein the particles are a non-coherent fibrous material having a length of between 0.05 and 50 mm and a length-to-diameter ratio of between 2:1 and 150:1.

7. The process according to claim 1 wherein the resulting foam has a layer of particles thereon of between 1 and 50 times the average cross-section of the particles.

8. The process according to claim 7 wherein the resulting foam has a layer of particles having a thickness of between 1 and 10 times the average cross-section of the particles.

9. The process according to claim 1 wherein the foam-forming composition is applied to an adhering substrate.

10. The process according to claim 1 wherein the plastic foam is coated on two sides thereof by prior to step (1) distributing the particles on a non-adhering substrate, then distributing the foam-forming composition as in step (1) onto the particles thus applied, and subsequently conducting steps (2) and (3) to produce a plastic foam coating on two sides.

11. The process according to claim 1 wherein the thermosetting plastic foam is a polyurethane foam, wherein a polyisocyanurate foam, a phenoplast resin foam, or an aminoplast resin foam.

12. The process according to claim 11 wherein a foaming agent is used for the polyurethane foam or the polyisocyanurate foam.

* * * * *